United States Patent [19]

Iovino

[11] Patent Number: 5,223,543

[45] Date of Patent: Jun. 29, 1993

[54] REDUCTION IN POLYSTYRENE WITH ACTIVATED AGENT

[76] Inventor: Claudia Iovino, P.O. Box 273267, Boca Raton, Fla. 33427-3267

[21] Appl. No.: 963,566

[22] Filed: Oct. 19, 1992

[51] Int. Cl.$^5$ .............................................. C08J 11/04
[52] U.S. Cl. .................................. 521/44.5; 521/146; 521/918
[58] Field of Search ...................... 521/44.5, 146, 918

[56] References Cited

U.S. PATENT DOCUMENTS 4,668,709  5/1987  Jones et al. ........................... 521/31
5,079,274  1/1992  Schneider et al. ..................... 521/31

Primary Examiner—Morton Foelak

[57] ABSTRACT

This invention is a method to speed up and prevent inconsistent rates of reaction in the reduction of volume of polystyrene foam products by the application of a liquid and vapors of a terpine or isoprenoid compound where a heat activation within 90 days of the use provides maximum reactivity. In one embodiment the process is localized by the addition of heaters in the processing vessels or tanks to insure active agent form of d-limonene reduction agent.

13 Claims, 3 Drawing Sheets

REDUCTION IN POLYSTYRENE WITH ACTIVATED AGENT

SUMMARY OF INVENTION

This invention reveals a method to provide rapid destruction of the cells of polystyrene foams by use of a chemical, d-limonene that is in an active form which readily attacks the foam and allows easy recycling and allows economical transportation and storage prior to recycling. The process involves the exposure of the foams to vapors or sprays of d-limonene which has been subjected to thermal conversion to an active state within 1 to 3 months of use. The activation is by heat or distillation and provides a faster dissolution of the foam, a property that is greatly reduced when the chemical is stored.

BACKGROUND

Polystyrene foams have become popular because they are relatively rigid, they are very light, and they are good insulators. As a result of these properties the foamed polystyrene container has a great proportion of the packaging, the food container and the beverage container markets, a total of billions of pounds a year of polystyrene foam in all.

There are problems with the foamed polystyrene product. The lightweight property that makes it so useful is also a major problem. The fine cells of the foam do not easily compact and the product takes large volumes in areas such as landfills and is so fluffy and light it is hard to recycle. As cups break up they tend to float and blow in a most annoying manner and can be a real source of visual pollution. Also, being a synthetic resin, there is little natural degradation of the base polymer so the foam particles stay around for a long time.

The landfill volume and the durability problems have resulted in major unfavorable publicity for the polystyrene foam product industry. While there is more plastic in many paper cups than in a foam beverage cup, the foam cup is very visible and has become a focal point of the debate on recycling. There have been bans on use of polystyrene food containers within towns due to the load placed on landfills, boycotts and picketing of users by concerned citizens and environmentalists, and substitutions of other materials. The uses and advantages of foam continue but there is a growing movement to require recycling of foam products as well as other plastic materials. A need exists to make polystyrene foam either landfill volume compatible with other types of trash or to find an effective way to recycle it.

In the case of polystyrene foam products, recycling is not easy. In one well documented case, McDonalds in Rochester, NY pledged to recycle from three outlets located in that city. The polystyrene is segregated in separate containers on the floor of the food service area by customers and the bags of foam product from those containers are removed when full and stored. At regular intervals the foam filled bags are trucked to the nearest recycler in Springfield, MA. The truck which is a standard 45 foot trailer and tractor normally would hold up to 40,000 pounds and the cost of the trip, approximately $1500 would amount to a net cost of under 4 cents per pound. The lightweight foam is not a normal material and in the bagged foam a typical load is only 1000 pounds which increases the cost to $1.50 per pound for shipping. For a material that sells as virgin resin pellets in the $0.50 to 0.60 per pound range, the shipment costs alone are nearly three times the maximum value of the recycle. There is a pressing need for volume reduction of foams to make shipping effective.

The problem with recycle does not stop at the shipment costs since a very high volume of material that weighs little must still be reprocessed. The lightweight foam must be reduced in some manner. As noted above it is a good insulator so thermal softening of the foam to compact it requires long times and during these extended low level heatings the resin may be degraded. Compaction by normal means is totally ineffective due to the multiplicity of cells that must be broken. Several methods have been developed such as the poly puff where material is compacted by shear heating against the sides of a drum as a rapidly rotating rotor mixes and stirs the material and use of crammers and enlarged feed section extruders. None of these methods are very effective in reducing foam volume and there is a need for an effective way to introduce foam materials to an extruder or other reprocessing machine.

Once in a typical extruder the normal screw would compact resin by a ratio of under 3 to 1. This compaction is due to a change in the depth of the root of the screw and in addition in some screws it would also be due to a change in the pitch of the screw. As noted before the foam can be reduced thirtyfold before the foam is completely broken down. A screw with flight depth to accomplish a 30:1 volume reduction would not have enough strength to turn due to the extreme depth needed in the root at the feed area and the very narrow outlet end would overshear the polymer and overheat or degrade it. There is a need for a foam volume reduction method to allow use of more normal plastic recycle and processing equipment. At present extra compaction steps and very expensive and specialized equipment is required to recycle polystyrene.

One aproach to the recycling is to use chemicals to reduce the foams. The basic problem is that the chemicals that are obvious are very toxic to the environment and they are often banned by SARA or similar environmental legislation. One chemical series, pinene and terpenes such as d-limonene to reduce the foam volume. This approach is interesting but it fails in some cases. There is an inconsistent activity in collapsing foams that has not previously been noticed. There is a need for such a process but that process must be rapid and effective to have commercial value.

In general all of these problems at present make the recycling of polystyrene foam non-economic and as a result it will not become a commercially viable concept until the shipment and extrusion of polystyrene foams can be reduced in cost. It will also be needed to improve the methods of converting the foams back into pellets or products for further use of the recycled polystyrene.

DESCRIPTION OF THE INVENTION

This invention solves the volume problem of polystyrene foam materials and allows the easy and inexpensive shipment of the foamed materials after reduction in volume by use of an activated d-limonene chemical in liquid or vapor form to reduce the foam.

The use of active chemicals assists in making foamed polystyrene materials easier to incinerate. The product of this process and method is pumpable and can be injected into the furnaces of a number of commercial processes where the high fuel value of the material offers energy savings. Once the dissolution is accomplished, the activity of the chemical becomes irrelevant.

The process of volume reduction has been hampered by inconsistent rates of dissolution, sometimes the rates being too slow to be effective. This invention cures this problem.

The materials used in this method of volume reduction are also recoverable by removal at multiple vent ports and the majority of compounds used can be easily separated from moisture and volatile organics by a combination of decanting and thermal stripping.

The materials are further environmentally safe in active of less active forms.

The chemical activation process method utilizes a solid and a liquid or a liquid/vapor delivery system that combine to effectively reduce polystyrene foams to a minimum volume without the use of banned or health sensitive chemicals and to do this quickly. The formula used containing d-limonene attacks foam by dissolving the foam in the vapors of this natural organic compound. The process has been ineffective in many applications because of differences in the rates of dissolution. While the dissolution first happens in the highly stressed thin walls between the bubbles that make up the foam and then as the disrupted walls collapse over time, the thicker portions of the foam where cell walls intersect slowly also collapse. In some cases this process is very fast and effective but in others it requires extended storage for full reduction. Although the process is a dissolving of the polystyrene into a gel like consistency by the d-limonene, the rate variations made the process difficult to perform and caused a variety of d-limonene concentration levels to accomplish a similar end result. The co-solvent is a material with a high affinity for polystyrene and the liquid and the vapors of this solvent are drawn to the polystyrene. The problem was the rate differences of this affinity which made a process that was superb at times and marginal at other times.

The solution was the result of several studies. The slowing seemed to be a factor of time but for a pure chemical this did not seem logical so for an extended period the process studies looked for oxidation products, packaging derived contamination or other additives that had an adverse effect on the process.

Finally, returning to an archived original chemical sample, it was found that the original rates were greatly reduced in this well tested glass stored sample. Further studies showed that d-limonene changes in storage. After a storage period of 30 to 90 days it is relatively slow to act and it continues to decay in its dissolution effectiveness. In a freshly distilled state the rate was several times faster than the stored samples.

The goal of the process is the disposition of foam in a fabricated product or a peanut shape as is often used in packaging and to do this by making the foam into reduced stage goo where it is 3 to 10 percent of its former volume. The process using d-limonene is easy and safe. The process is best volumetrically or weight basis controlled but if the activity changes this control method fails. This invention provides an active state of d-limonene that allows close process control and effective foam volume reduction.

In the fall of 1989 a spectacular display was needed to showcase the fragrances and polishes of HKI Inc. at a trade show. One of the products was a solid based dumpster deodorizer that came in several fragrances, including a citrus fragrance.

This product, a new introduction, had just been found to also have some effect on polystyrene cups. The effect was noted but again a connection with waste problems was slow in arriving. At this point we invented a "reason" to use the deodorizer product and found that the concept of dissolving foam was an attention getter. At this point a display of blocks of foam slowly crumbling under a drip of the fragrance concentrate was a show stopping curiosity.

The fragrance drip, while spectacular, was not economical since perfumes are expensive and the bulk of the product evaporated with no effect on the foam. We were using about a pound of chemical to dissolve a pound or less of foam. The phenomena remained merely a curiosity.

The products of HKI were fragranced deodorizing compounds. This application brought sales into contact with food service vendors who were fighting the problem of polystyrene foam waste. There was an effect in one of the perfume components but at that time the use of the perfume as a foam dissolver was instantly rendered ridiculous by cost factors. In lab and field testing the active ingredients of the reduction were finally identified. Even knowing the reason for the dissolution, the cost remained too high. A later identification of the unexpected affinity of the vapors of the solvent previously identified as an active agent in the process became the key to a successful foam volume reduction process. The kinematics of the solution process were such that the polystyrene foam acted like salt acts with humid air. Since the air around the testing never was so saturated with the vapors, it was only in watching the trash from unsuccessful experiments that the effect of the vapors of the solvent were noted. The closed bags containing scrap from a variety of experiments continued to settle due, we found out, to the continuing reduction of the polystyrene into a liquid containing goo. In basic terms, the polystyrene foams actually attracted the solvent vapors and absorbed them. The sorption process when there was sufficient vapor present was one that continued until the foam was reduced to a viscous liquid. It appears that the two materials are totally mutually soluble. The second effect that makes this a commercial process is that the highest driving force is for the initial sorption and the process slows with time and as the solvent level increases. This phenomena is fairly normal in physics and industry where the entropy of all compounds or matter slowly drops. In chemistry all materials that can react do so, but often very slowly, and thus, over some hundreds of years even the relatively inert plastics will oxidize. This aggressive mutual solubility is relatively fast as long as there is a presence of the needed vapors and polystyrene foams. This early conclusion later was conditioned on a seeming variation in rates that was finally understood to be due to a more active form of the d-limonene chemical. Use of the active form of the d-limonene was needed to provide speed and consistency to the process.

The process in this invention would still be a curiosity if the solvents used were some of the common materials such as acetones, methylene chlorides or other relatively toxic compounds. This is not the case, the active chemical is one of a series of terpene compounds or isoprenoid compounds that are often found in natural extracts. The first material identified, d-limonene is an extract from the pressing of citrus peels. It is used in food products, in cosmetics, and in the original use we found, the perfume area. As a natural and a GRASS approved compound, and as a compound that had been frequently used as an area deodorant in food and sanitary establishments, this material is essentially harmless. Other terpenes were also found to react in a similar manner and pinene and citronella, citral, and similar materials, especially those with a C10H16 base. The oxygenated derivatives of these C10 compounds which are camphor type materials were found to be effective in the foam reduction process. The cost of most of these rather complex compounds is excessive but several pine and citrus extracts are plentiful and low in cost as well as effective in this process. Many of the effective compounds are also known as the isoprene rule compounds due to the even multiples of the C5 isoprene structure.

At earlier points in the research, the key conditions were the presence of a vapor of the above compounds and polystyrene foams. The volatile oils which were the key solvents all have relatively low boiling points and thus to make the process effective, restriction of the vapor must also be present. The simplest use of this process utilizes a plastic bag of a material not mutually soluble or very slightly soluble in terpenes, especially in d-limonene with foam and the solvent added and then the bag tied shut. While these factors were important, this invention discloses one additional factor that is critical. The extra factor is the "freshness" of the chemical solution. Freshness is defined here as the time since heating to boiling point or the time from the steam distillation of the product. The heating activates the chemical, especially d-limonene.

Complex versions of the process were also developed that use tanks to enclose the solvent and even rooms of very high solvent concentration are possible. The tank concept can be enhanced with a very low wattage heater near the bottom material since the heat would further assist in production of vapors. In the tank case the present invention is even more important since the heater can be set at a high level that vaporizes the d-limonene and activates it, thus insuring constant high activity dissolution action.

The process is affected, as are most chemical actions, by the concentration, the temperature (which controls the vapor level), and the relative level of the polystyrene material as well as by freshness.

One effect was noted that is especially advantageous in this foam reduction process. The very large volume and thin wall of the walls of the foam individual cells was such that the cell walls very rapidly break down with the takeup of sufficient solvent to continue the dissolution to the thicker cell portions formed when adjacent cells intersect. This causes a rather rapid shrinking of the foam materials. In tests using bags with "fresh" solvent and foam, the reduction is noticeable within 10 minutes and is nearly complete after an hour. This rate was about double that found previously with aged d-limonene.

The time factor in this process would probably have caused people to shy away from the concept. In fact, time is not a critical factor with a food service outlet having trash pickup at the most once per day and in reprocessing plants some days of materials being stored. The faster action possible with the fresh chemical however makes the total storage area much smaller and allows less total chemical use.

The first process used polyethylene bags to retain the vapors and prevent evaporation. This process worked well for small local foam applications. It had one problem, separation of the goo from the bag was difficult. While several logical methods were developed to effectively separate the materials, there remained a need for a further process that did not cause a polyethylene bag to be used. The process modification for larger users that is even more effective is the use of steel tanks as the dissolution containers and further tanks for the storage of the materials after they are reduced to the goo state.

Stackable stainless bottom valved tanks are now available for motor and food grade oil collection. These tanks typically contain a screen to collect larger solids and a reservoir for the oil. The tanks are pumped empty, typically by vacuum tanks mounted on collector trucks of waste haulers or recycling firms. These tanks were found to provide the key elements of the process and to allow cans or bags of foam materials to be emptied into the tanks and then be reused. The limonene liquid was sprayed at intervals into the tank and the fumes from the bottom goo added to the new material were very effective in reducing the volume of the foam material. A further improvement is the use of stacked tanks with the bottom tank allowing fumes to rise into a top closed tank and the top tank allowing the draining of the goo as it accumulates into the bottom storage tank. In the present invention, provision of a heater insures that the d-limonene is activates and at maximum effectiveness, further improving the process.

PREFERRED EMBODIMENT OF INVENTION

Figure 1:
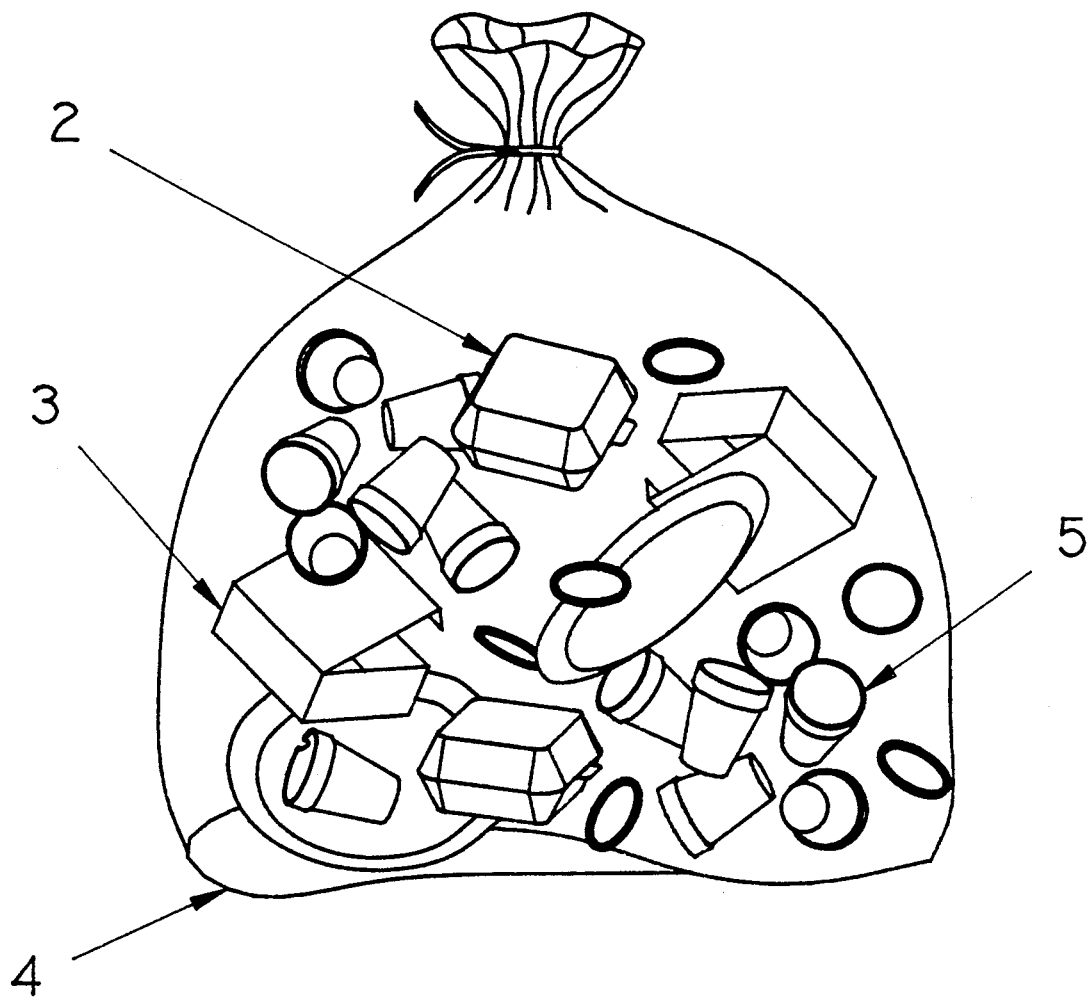
In FIG. 1 the process is shown as it happens in a polyethylene trash bag. The bag 1 is shown in cross section with polystyrene foam trash 2 being attacked from the vapors of the liquid that was initially poured into the bag 3 and the liquid 4 poured into the bag just before sealing. In addition to the effect of the liquids, fumes 5 are shown rising and attacking the foam. As the foam collapses, it settles into the bottom of the bag.
Figure 2:
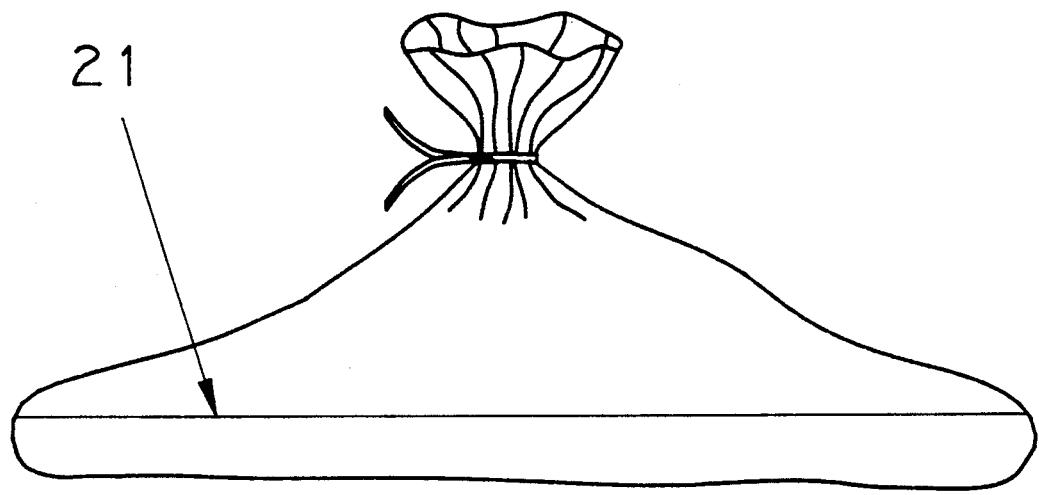
In FIG. 2 the bag is shown totally collapsed with the dissolved polystyrene goo 21 at the bottom.
Figure 3:
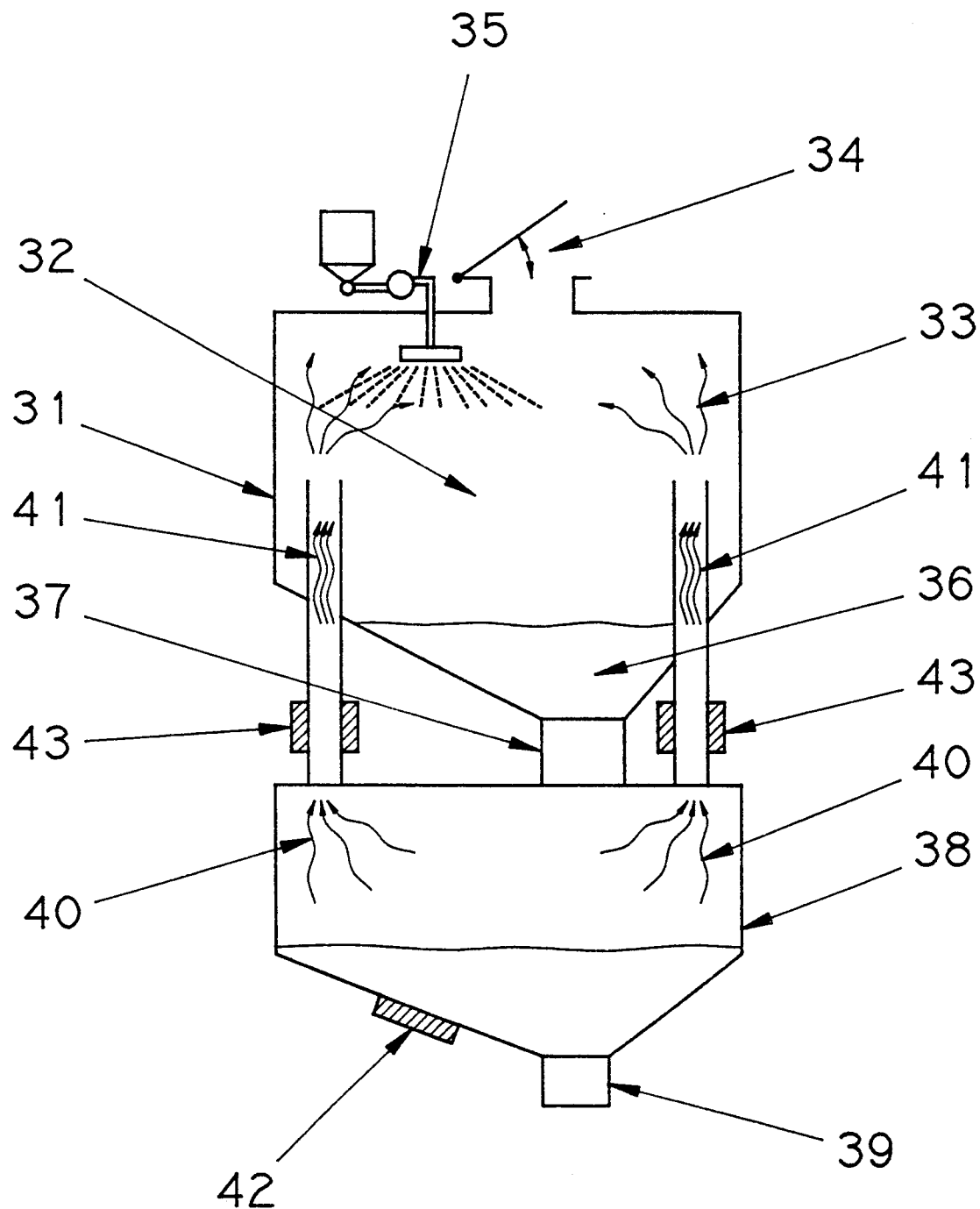
In FIG. 3 a stacked container system is shown with the top container 31 shown with trash foam 32 being attacked by fumes 33. The trash enters through port 34 and supplemental liquid solvents are added in spray system 35. The goo that collects in the tank is drained through the conical bottom 36 and the bottom valve 37 to holding tank 38. The holding tank has a drain valve for removal of the contents 39 and upcomers that allow vapors to rise and enter the top tank at 40 through top tank upcomers 41. A small heater is shown as 42 which can add further vapor by increasing the temperature in the lower container and a heater 43 is added to the vapor passage to activate the vapors as they enter the top container.

The preferred embodiment of this invention is a trash or or garbage bag contained polystyerene reduction system. A 45 gallon trash bag is set into a can that is dedicated to foam wastes in an establishment such as a fast food restaurant. Typically this can has a swing door top that loosely fits on the can and helps to hold the bag in place. The bag is also often held at the top by clips to prevent it collapsing inside the can.

The open bag is then sprayed with 3 or 4 fluid ounces of a concentrate that is d-limonene and which has been treated by heating to its boiling point within 90 days of its use.

When the bag is filled by customers, an additional 3 to 4 ounces of concentrate that has been treated by heating within the previous 90 days is sprayed into the can and the bag is removed and the top of the bag is sealed with a twist tie. The bag is removed to a back storage area where it is left for at least 2 hours. While the bag sits in storage, the reduction process that started in the semi open can is accelerated by the trapping of the active limonene containing concentrate and the polystyrene foam has a collapse of the cell membranes, then of the cell structure as the vapors are absorbed and the polystyrene is reduced to a jelly like liquid. The actual consistency is dependent on the amount of foam present and the amount of concentrate.

The bags filled with the jelly like liquid are now either packed in containers for shipment or are drained into drums or tanks for shipment. At this stage the volume of the foam has typically been reduced by a factor of thirty to one.

In a second embodiment special stainless steel tanks are modified for this process. These 4 foot by 4 foot by 4 foot tanks are stackable. The top tank is modified with an internal spray unit that can spray a preset amount of concentrate on the foam. There are raised internal standoffs that consist of an 8 inch diameter pipe that projects two feet from the tank bottom and is open to the outside of the tank in each corner and the bottom is slightly dished to allow material inside the tank to run toward the center where there is a valved drain, the bottom of which projects three inches from the bottom of the top tank. The bottom tank is of similar dimensions and has a set of pipes that project upward and fit into the corner 8 inch pipes of the top tank and make a seal that is vapor tight between the two tanks. The seal is effected by tapering the bottom pipes that project upward so there is a metal to metal seal between the tapered bottom tank pipe and the straight top pipe, although many other seal methods would also work. These corner pipes allow vapors from the bottom tank to flow into the top tank without restrictions and the raised top pipes prevent backflow of goo that would block the vapor flow. The center drain in the top tank mates with a similar center fitting to form a vapor tight seal between the two tanks which allows the draining of liquids from the top tank to the bottom storage tank.

With this large volume bottom storage tank the vapors are always available to aid in the reduction process going on in the top tank, the top liquids are trapped in the top by the bottom drain which is raised from the tank bottom and only goo drops through the valve which has a screen into the storage area. For most users, the tank stores a weeks use of reduced foam materials and once a week the tank is drained by a vacuum tank which is equipped much like a septic tank pumping truck and vacuums the goo from the bottom tank. In this embodiment there is the addition of a heating element in the bottom of the lower tank to facilitate the production of vapors. This heater is further supplemented by a heated tube which brings the d-limonene to a temperature where it would normally boil, thus activating it.

We claim:

1. A method to reduce volume of polystyrene foams where foam products are subject to the vapor of terpenes in an enclosed area for a period of time until they are reduced to a viscous fluid, said terpenes being heat treated within the previous 90 days to activate them.

2. The method in 1 where said polystyrene foams are reduced in volume by the effect of sprayed liquids containing terpenes in addition to said vapors.

3. The method in 1 where said terpenes consist primarily of d-limonene.

4. The method in 2 where said terpenes consist primarily of d-limonene.

5. The method in 1 where said enclosed area is a plastic bag.

6. The method in 2 where said enclosed area is a plastic bag.

7. The method in 2 where a tank is used to store polystyrene foam products and said terpene material is introduced into said tank, and a heater within said tank activates the terpene materials by heating them to their boiling point.

8. The method in 2 where a tank equipped to spray a terpene material onto polystyrene foam products inside a tank which contains the vapors of the terpene.

9. The method in 8 where said terpene is D-limonene which has been activated by heating to its boiling point within the previous 90 days.

10. The method in 1 where said terpene is an isoprenoid compound or an oxygenated isoprenoid compound.

11. A system to reduce the volume of polystyrene foams wherein said polystyrene foams are exposed to vapors of d-limonene over an extended period in a container which prevents escape of said vapors and where a heater heats vapors of said d-limonene.

12. The system in 11 where said vapors are contained in a tank or vessel which has ports for addition of polystyrene foams, for addition of D-limonene, and for withdrawal of dissolved polystyrene resins.

13. The system in 12 where said vapors arise from a combination of a spray of the liquid d-limonene and vapors transported from a second tank, said transported vapors heated to the boiling temperature to activate them, and the polystyrene foam in its reduced state is withdrawn by flow to said second tank.

* * * * *